United States Patent
Keller et al.

(10) Patent No.: US 11,307,935 B2
(45) Date of Patent: Apr. 19, 2022

(54) MANAGEMENT OF VOLUME SNAPSHOTS IN A DATA STORAGE SYSTEM

(71) Applicant: EMC IP Holding Company LLC, Hopkinton, MA (US)

(72) Inventors: Itay Keller, Tel Aviv (IL); Asaf Porath, Tel Aviv (IL); Michal Yarimi, Rehovot (IL); Zeev Shusterman, Haifa (IL); Dvir Koren, Nahalal (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 150 days.

(21) Appl. No.: 16/836,824

(22) Filed: Mar. 31, 2020

(65) Prior Publication Data
US 2021/0303407 A1 Sep. 30, 2021

(51) Int. Cl.
| G06F 16/90 | (2019.01) |
| G06F 11/14 | (2006.01) |
| G06F 16/901 | (2019.01) |
| G06F 16/907 | (2019.01) |

(52) U.S. Cl.
CPC ...... *G06F 11/1451* (2013.01); *G06F 11/1471* (2013.01); *G06F 16/907* (2019.01); *G06F 16/9027* (2019.01); *G06F 2201/84* (2013.01)

(58) Field of Classification Search
CPC .............. G06F 16/9027; G06F 16/907; G06F 11/1451
USPC .......................................................... 707/654
See application file for complete search history.

(56) References Cited

U.S. PATENT DOCUMENTS

| 5,381,539 A | 1/1995 | Yanai et al. |
| 5,551,003 A | 8/1996 | Mattson et al. |
| 5,764,880 A | 6/1998 | Gerdt et al. |
| 6,052,799 A | 4/2000 | Li et al. |
| 6,941,420 B2 | 9/2005 | Butterworth et al. |
| 8,843,676 B2 | 9/2014 | Rajamanickam et al. |
| 9,372,751 B2 | 6/2016 | McNutt |

(Continued)

FOREIGN PATENT DOCUMENTS

WO PCT/US2019/024885 1/2020
WO PCT/US2019/024900 1/2020

OTHER PUBLICATIONS

Dell EMC, "Dell EMC VxRack FLEX," Dell EMC Product Overview, 2018, 5 pages.

(Continued)

*Primary Examiner* — Eliyah S. Harper
(74) *Attorney, Agent, or Firm* — Ryan, Mason & Lewis, LLP

(57) ABSTRACT

Techniques are provided for managing snapshot volume trees in a snapshot-enabled data storage system. A snapshot management system is configured to maintain a snapshot volume tree for a storage volume of a storage system, wherein the snapshot volume tree comprises a data structure which comprises a plurality of snapshot volume nodes corresponding to respective ones of (i) a root volume and (ii) multiple snapshots related directly or indirectly to the root volume, wherein the snapshot volume nodes comprise respective generation times which denote times that the respective snapshot volume nodes were created. The generation times are used in conjunction with write times of data items that are written to the snapshot volume nodes to manage snapshot reading and deletion operations.

20 Claims, 7 Drawing Sheets

(56) References Cited

U.S. PATENT DOCUMENTS

| | | | |
|---|---|---|---|
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2015/0113218 | A1* | 4/2015 | Shi ................ G06F 3/0665 711/114 |
| 2015/0134616 | A1* | 5/2015 | Zheng ............. G06F 11/1464 707/639 |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0227845 | A1 | 7/2019 | Sridhar et al. |
| 2020/0125531 | A1* | 4/2020 | Troshin ........... G06F 16/9038 |
| 2020/0301784 | A1* | 9/2020 | Chen ............... G06F 11/1464 |
| 2020/0310649 | A1* | 10/2020 | Chen ............... G06F 3/0653 |
| 2021/0216571 | A1* | 7/2021 | Chen ............... G06F 11/1469 |
| 2021/0224163 | A1* | 7/2021 | Chen ............... G06F 16/273 |
| 2021/0294774 | A1* | 9/2021 | Keller ............. G06F 16/9027 |
| 2021/0294775 | A1* | 9/2021 | Keller ............. G06F 16/128 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 12 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006. 1598129, pp. 200-211.

Wikipedia, "Raft (Computer Science)," https://en.wikipedia.org/wiki/Raft_(computer_science), Feb. 10, 2020, 4 pages.

Wikipedia, "Paxos (ComputerScience)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots."

U.S. Appl. No. 16/807,709 filed in the name of Avi Puder et al. filed Mar. 3, 2020, and entitled "Management of Shared Resources in a Software-Defined Storage Environment."

U.S. Appl. No. 16/822,818 filed in the name of Itay Keller et al. filed Mar. 18, 2020, and entitled "Storage System Implementing Snapshot Longevity Ranking for Efficient Management of Snapshots."

U.S. Appl. No. 16/822,848 filed in the name of Itay Keller et al. filed Mar. 18, 2020, and entitled "Assignment of Longevity Ranking Values of Storage Volume Snapshots Based on Snapshot Policies."

U.S. Appl. No. 16/823,813 filed in the name of Itay Keller et al. filed Mar. 19, 2020, and entitled "Managing Incompressible Data in a Compression-Enabled Log-Structured Array Storage System."

U.S. Appl. No. 16/830,469 filed in the name of Roi Tagar et al. filed Mar. 26, 2020, and entitled "Storage Block Balancing Using Volume Part Migration."

U.S. Appl. No. 16/830,473 filed in the name of Yugal Peleg Lieblich et al. filed Mar. 26, 2020, and entitled "Replicated State Cluster with Standby Node State Assessment During Leadership Transition."

U.S. Appl. No. 16/830,946 filed in the name of Gil BenZeev et al. filed Mar. 26, 2020, and entitled "Storage Volume Migration Scheduling Based on Storage Volume Priorities and Specified Constraints."

U.S. Appl. No. 16/832,763 filed in the name of Michal Yarimi et al. filed Mar. 27, 2020, and entitled "Managing Storage Device Errors During Processing of Inflight Input/Output Requests."

U.S. Appl. No. 16/834,363 filed in the name of Itay Keller et al. filed Mar. 30, 2020, and entitled "Managing Least Recently Used Cache Using Reduced Memory Footprint Sequence Container."

* cited by examiner

100

MANAGEMENT OF VOLUME SNAPSHOTS IN A DATA STORAGE SYSTEM

FIELD

This disclosure relates generally to information processing systems, and more particularly to data storage management in information processing systems.

BACKGROUND

Conventional block storage systems are configured to support logical units (LUNs) or other types of storage volumes into which users may write data and from which that data may be read. Users may choose to place data intended for specific uses/applications into separate volumes, so that the data can be easily managed and distinguished. Most storage systems also support functionality for generating volume snapshots. A given such snapshot illustratively comprises a point-in-time copy of the volume. The volume snapshot generation functionality therefore provides the ability to "freeze" the data in a volume at a certain point in time. A given such snapshot can also serve as the source for other snapshots that are spawned from it (e.g., in use cases involving backups). Snapshots can usually be deleted by a user at will, without any type of restrictions.

A simplistic approach for snapshot generation involves duplicating all data of the source volume at the time of snapshot creation. However, this simplistic approach is not only time-consuming, but also highly inefficient in terms of storage space. A better approach is to store just the data unique to that particular snapshot, with any reads to other non-uniquely written regions being redirected to a previous snapshot or the original volume. This approach results in sparsely populated snapshots each of which includes just the uniquely-written data of that particular snapshot. Since the entire data set is not duplicated in this approach, the uniquely-written data is stored in association with additional information, commonly referred to as metadata, which identifies where, in a volume offset domain, the data belongs. This facilitates both access to the unique data itself, and the ability to determine whether redirection to another snapshot or the original volume is required.

Although storing only uniquely-written data within snapshots enables optimal storage space utilization, conventional techniques for reclaiming storage space for overwritten or deleted data items of a volume from the sparsely-populated snapshots tend to be inefficient, and can undermine the overall performance of the storage system.

SUMMARY

Exemplary embodiments of the disclosure include techniques for managing snapshot volume trees in a snapshot-enabled data storage system. In one embodiment, a snapshot management system maintains a snapshot volume tree for a storage volume of a storage system, wherein the snapshot volume tree comprises a data structure which comprises a plurality of snapshot volume nodes corresponding to respective ones of (i) a root volume and (ii) multiple snapshots related directly or indirectly to the root volume, wherein the snapshot volume nodes comprise respective generation times which denote times that the respective snapshot volume nodes were created. The snapshot management system receives a read request comprising a read address for accessing a given data item from a target snapshot volume node, and accesses a sorted list of one or more metadata objects, wherein each of the one or more metadata objects corresponds to a different version of the given data item stored in different snapshot volume nodes of the snapshot volume tree, wherein each metadata object comprises a descriptor that identifies a host volume node of the given version of the data item and a descriptor which identifies a write time of the given version of the data item. The snapshot management system iteratively processes the one or more metadata objects in the sorted list to identify a target version of the given data item which can be read from one of (i) the target snapshot volume node and (ii) another snapshot volume node which is an ancestor of the target snapshot volume node and which has a generation time that is greater than the write time of the target version of the given data item, responds to the read request by returning the identified target version of the data item.

In another embodiment, a snapshot management system maintains a snapshot volume tree for a storage volume of a storage system, wherein the snapshot volume tree comprises a data structure which comprises a plurality of snapshot volume nodes corresponding to respective ones of (i) a root volume and (ii) multiple snapshots related directly or indirectly to the root volume, wherein the snapshot volume nodes comprise respective generation times which denote times that the respective snapshot volume nodes were created and performs a volume node deletion process to delete a target snapshot volume node from the snapshot volume tree. In performing the volume node deletion process, the snapshot management system determines whether the target snapshot volume node has one or more child volume nodes. In response to determining that the target snapshot volume node does have one or more child volume nodes, the snapshot management system determines which child volume node is a youngest child volume node based on the respective generation times of the one or more child volume nodes, and merges the determined youngest child volume node with the target snapshot volume node to create a new snapshot volume node which resides in a same hierarchical position as the target snapshot volume node in the snapshot volume tree and which is assigned the generation time of the target snapshot volume node.

Other embodiments of the disclosure include, without limitation, methods, server nodes, and articles of manufacture comprising processor-readable storage media for managing snapshot volume trees in a snapshot-enabled data storage system.

DETAILED DESCRIPTION

Exemplary embodiments will be described herein with reference to exemplary information processing systems that implement snapshot-enabled storage systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1A:
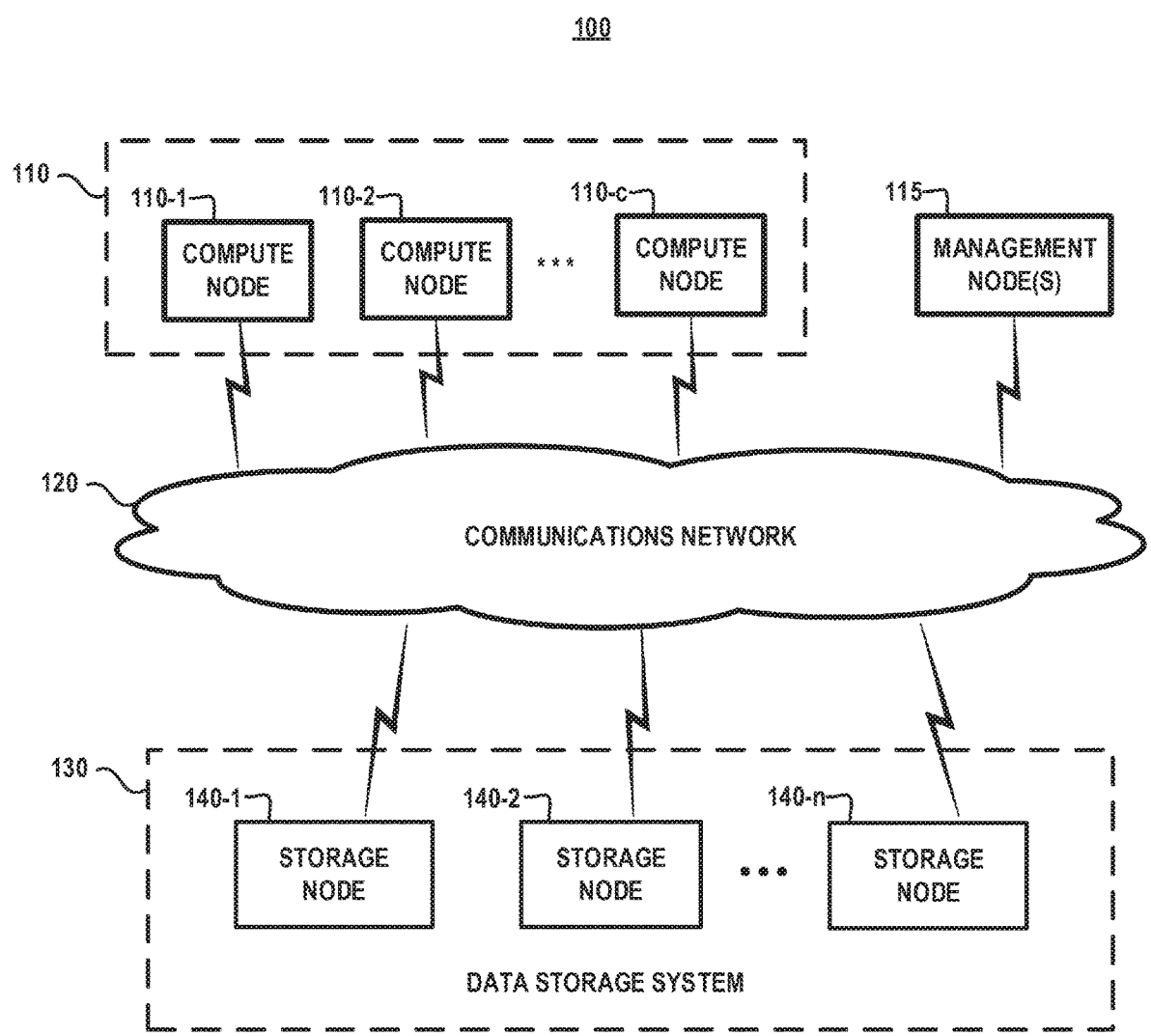
FIGS. 1A and 1B schematically illustrate an information processing system comprising a snapshot-enabled storage system according to an exemplary embodiment of the disclosure.
Figure 1B:
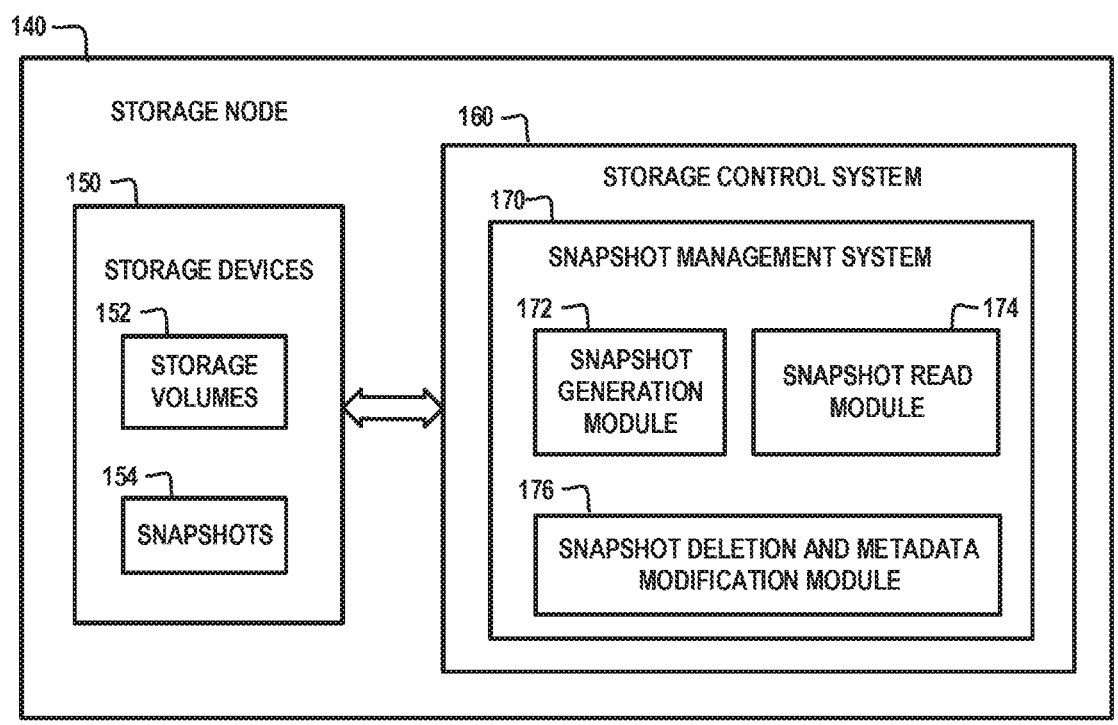

FIGS. 1A and 1B schematically illustrate an information processing system comprising a snapshot-enabled storage system according to an exemplary embodiment of the disclosure. More specifically, FIG. 1A schematically illustrates an information processing system 100 which comprises a plurality of compute nodes 110-1, 110-2, . . . , 110-*c* (collectively referred to as compute nodes 110), a communications network 120, and a data storage system 130. The data storage system 130 comprises a plurality of storage nodes 140-1, 140-2, . . . , 140-*n* (collectively referred to as storage nodes 140, or each singularly referred to as storage node 140). FIG. 1B schematically illustrates an exemplary framework of at least one or more of the storage nodes 140. As shown in FIG. 1B, the storage node 140 comprises storage devices 150 and a storage control system 160. The storage control system 160 comprises a snapshot management system 170. The snapshot management system 170 comprises a snapshot generation module 172, a snapshot read module 174, and a snapshot deletion and metadata modification module 176, the functions of which will be explained in further detail below.

The compute nodes 110 illustratively comprise physical compute nodes and/or virtual compute nodes which process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue input-output (IO) requests that are processed by a corresponding one of the storage nodes 140. The term "input-output" as used herein refers to at least one of input and output. For example, IO requests may comprise write requests and/or read requests directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Internet Protocol (IP) or other communication protocols such as Fibre Channel data transfer protocol, an iSCSI (Internet Small Computer Systems Interface) data transfer protocol, Peripheral Component Interconnect express (PCIe), InfiniBand, Gigabit Ethernet, etc., to support storage network connectivity. Numerous alternative networking arrangements are possible in a given embodiment, as will be appreciated by those skilled in the art.

The data storage system 130 may comprise any type of data storage system, or combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein is therefore intended to be broadly construed, and should not be viewed as being limited to storage systems of any particular type or types. In some embodiments, the storage nodes 140 comprise storage server nodes (e.g., server node 800, shown in FIG. 8) having one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed, and a storage system in some embodiments can be implemented using a combination of storage nodes and compute nodes.

In some embodiments, as schematically illustrated in FIG. 1B, the storage node 140 is a physical server node or storage appliance, wherein the storage devices 150 comprise DAS resources (internal and/or external storage resources) such as hard-disk drives (HDDs), solid-state drives (SSDs), or other types of non-volatile memory (NVM) devices such as flash memory, non-volatile random access memory (NVRAM), phase-change RAM (PC-RAM) and magnetic RAM (MRAM). These and various combinations of multiple different types of storage devices 150 may be implemented in the storage node 140. In this regard, the term "storage device" as used herein is intended to be broadly construed, so as to encompass, for example, SSDs, HDDs, flash drives, hybrid drives or other types of storage devices. The data storage devices 150 are connected to the storage node 140 through, e.g., a host bus adapter, and using suitable protocols such as ATA, SATA, eSATA, NVMe, SCSI, SAS, etc. In other embodiments, the storage node 140 can be network connected to one or more NAS nodes over a local area network.

The storage control system 160 is configured to manage the storage devices 150 and control I/O access to the storage devices 150 and/or other storage resources (e.g., DAS or NAS resources) which are directly attached or network-connected to the storage node 140. In some embodiments, the storage control system 160 is a component of a software-defined storage (SDS) system which supports the virtualization of the storage devices 150 by separating the control and management software from the hardware architecture. More specifically, in an SDS environment, the storage control system 160 comprises an SDS data server that is configured to abstract storage access services from the underlying storage hardware to thereby control and manage I/O requests issued by the compute nodes 110, as well as support networking and connectivity. The storage control system 160 comprises a software layer that is hosted by the storage node 140 and deployed in the data path between the compute nodes 110 and the storage devices 150 of the storage node 140, and is configured to respond to data I/O requests from the compute nodes 110 by accessing the storage device 150 to store/retrieve data to/from the storage devices 150 based on the I/O requests.

In an SDS environment, the storage control system 160 is configured to provision, orchestrate and manage the storage devices 150 of the storage node 140. For example, the storage control system 160 implements methods that are configured to create and manage storage pools (e.g., virtual pools of block storage) by aggregating capacity from the storage devices 150. The storage control system 160 can divide a storage pool into one or more volumes (e.g., storage volumes 152), wherein the volumes are exposed to the compute nodes 110 as block devices. The storage control system 160 exposes abstractions of block devices (e.g., virtual block devices). For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In the SDS environment, each storage node 140 in FIG. 1 runs an instance of the storage control system 160 which converts the respective local storage resources (e.g., DAS storage devices 150 and/or NAS storage devices) of the storage node 140 into local block storage. Each instance of the storage control system 160 contributes some or all of its local block storage (HDDs, SSDs, PCIe, NVMe and flash cards) to the aggregated pool of storage of the storage server node cluster (e.g., data storage system 130) to implement a server-based storage area network (SAN) (e.g., virtual SAN), wherein each storage server node 140 is part of a loosely coupled server cluster which enables "scale-out" of the software-defined storage environment. In this regard, each instance of the storage control system 160 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage control systems 160 operating as SDS data servers, the software-defined storage environment comprises other components such as SDS data clients and SDS metadata managers, which are not specifically shown in FIG. 1. More specifically, on the client-side (e.g., compute nodes 110), an SDS data client (SDC) is a lightweight block device driver that is deployed to expose shared block volumes to the compute nodes 110. The SDCs run on the same servers as the compute nodes 110 which require access to the block devices exposed and managed by the storage control systems 160 of the storage nodes 140. The SDC exposes block devices representing the virtual storage volumes that are currently mapped to that host. In particular, the SDC serves as a block driver for a client (server), wherein the SDC intercepts I/O requests, and utilizes the intercepted I/O request to access the block storage that is managed by the storage control systems 160. The SDC provides the operating system or hypervisor (which runs the SDC) access to the logical block devices (e.g., volumes). The SDCs have knowledge of which SDS control systems (e.g., storage control system 160) hold its block data, so multipathing can be accomplished natively through the SDCs.

The management nodes 115 in FIG. 1A implement a management layer that is configured to manage and configured the storage environment 100. In some embodiments, the management nodes 115 comprise the SDS metadata manager components, wherein the management nodes 115 comprise a tightly-coupled cluster of nodes that are configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that are required for system operation of the SDS environment such as configuration changes, managing the SDS data clients and data servers, device mapping, values, snapshots, system capacity including device allocations and/or release of capacity, RAID protection, recovery from errors and failures, and system rebuild tasks including rebalancing.

While FIG. 1A shows an exemplary embodiment of a two-layer deployment in which the compute nodes 110 are separate from the storage nodes 140 and connected by the communications network 120, in other embodiments, a converged infrastructure (e.g., hyperconverged infrastructure) can be implemented to consolidate the compute nodes 110, storage nodes 140, and communications network 120 together in an engineered system. For example, in a hyper-converged deployment, a single-layer deployment is implemented in which the storage data clients and storage data servers (e.g., storage control systems 160) run on the same nodes (e.g., each node deploys a storage data client and storage data servers) such that each node is a data storage consumer and a data storage supplier. In other embodiments, the system of FIG. 1A can be implemented with a combination of a single-layer and two-layer deployment.

Regardless of the specific implementation of the storage environment, the storage control system 160 implements any suitable logical volume management (LVM) system which is configured to create and manage the storage volumes 152 by aggregating the storage devices 150 into one or more virtual storage pools and logically dividing each storage pool into one or more storage volumes 152 that are exposed as block devices to the compute nodes 110. The creation of storage pools enables the generation of different storage tiers. A storage pool comprises a set of physical storage devices, wherein each storage device belongs to only one storage pool. In some embodiments, the storage pools are primarily utilized to group drives based on drive types and drive speeds, e.g. SSD and HDD. In some instances, a storage pool is generated to include a pool of storage devices that are aggregated using local storage devices of two or more of the storage nodes 140.

In this regard, the storage control system 160 implements volume management methods that are configured to support operations such as volume creation, volume deletion, volume mapping, etc. The storage volumes 152 illustratively comprise respective logical units (LUNs) or other types of logical storage volumes. The instances of the storage control system 160 of the storage nodes 140 include additional modules and other components typically found in conventional implementations of storage controllers and storage systems, although such additional modules and other components are omitted from the figure for clarity and simplicity of illustration.

In some embodiments, each storage control system 160 implements an instance of the snapshot management system 170. The snapshot management system 170 implements methods that are configured to generate snapshots of the storage volumes 152 and maintain snapshot data structures 154 for the snapshots, which are stored in association with the storage volumes 152 in the storage devices 150. Each snapshot data structure 154 is associated with one of the storage volumes 152. The snapshot data structures 154 comprise, for example, snapshot volume trees or other relational structures which identify relationships between the snapshots associated with the storage volumes 152. A snapshot data structure 154 includes snapshots, e.g., LUNs, that are created by capturing the state of data in one or more LUNs at a particular point in time. In some embodiments, a snapshot data structure 154 associated with a LUN that has not yet received a point-in-time snapshot may comprise only that LUN as a root node. In some embodiments, a snapshot may be both readable and writeable. In some embodiments, a snapshot may only be readable. In some embodiments, the snapshot may be configured at the time of the snapshot or at a later time to be either readable only or readable and writable.

The snapshot management system 170 implements various methods that are configured to execute functions such as snapshot creation, snapshot mapping, snapshot merging, snapshot reversion, and other similar operations related to the addition, modification, or deletion of snapshots of storage volumes. For example, the snapshot generation module 172 implements methods that are configured to generate snapshots for one or more of the persistent storage volumes 152. A snapshot comprises a read-only point-in-time copy of a storage volume. For example, an initial snapshot can be taken of a root storage volume at a given point-in-time, and then one or more additional snapshots can be taken at subsequent points in time to capture changes to the storage volume, i.e., each subsequent snapshot captures the changes that were made to the storage volume since the previous snapshot. A storage volume can be restored to a previous point in time by reverting to given snapshot, and volumes can be created from snapshots. In particular, a snapshot can be used to provision a new volume (e.g., a new volume pre-populated with the snapshot data) or to restore an existing volume to a previous state (represented by the snapshot).

The snapshot generation module 172 allows for rapid point-in-time copies to be made of a storage volume. More specifically, in some embodiments, the snapshot generation process is configured so that creating a snapshot does not involve making a duplicate copy of the source data. Instead, when an initial snapshot is created of a source storage volume, rather than generate a duplicate copy of the current state of the storage volume, the snapshot creation process simply copies the references to the source data and makes the source data as read-only. In this regard, the snapshot serves as a read-only copy of the source data at the point in time in which it was created and is accessible like a regular storage volume. Once the initial snapshot is taken of a storage volume with a dataset, subsequent snapshots copy the changed data only, and use a system of pointers and metadata to reference the initial snapshot. This method of pointer-based snapshots consumes less disk capacity than if the data set was repeatedly cloned. After a snapshot is taken, the snapshot system preserves the volume data set at that point in time by preserving any blocks that change after that point.

In this regard, unlike standard volumes, snapshots are thin-provisioned, which means that a full copy of the data is not copied over again upon creation of the snapshot, and that the storage pool associated with the snapshot only stores the changes. In this regard, the snapshots are maintained in the same storage pool as the source volume. Once an initial snapshot is taken of a storage volume, subsequent snapshots copy the changed data only (i.e., subsequent snapshots are delta snapshots that only contain changes since the last snapshot), which means that only the blocks on the device that have changed after the most recent snapshot are saved, and a system of pointers and metadata is utilized to reference the snapshots. This method of pointer-based snapshots consumes less disk capacity than if the data set was repeatedly cloned. This minimizes the time required to create the snapshot and saves on storage costs by not duplicating data.

After a snapshot is taken at a given point-in-time, the snapshot system preserves the data of the storage volume which exists at such point-in-time by preserving any data blocks that change after such point-in-time, thereby allowing the compute nodes 110 to continue writing data to a production volume. Once a snapshot is taken, the source storage volume can change over time, e.g., new data is written to the storage volume, existing data is updated, or data is deleted. In particular, when new data is to be stored, the system will allocate new blocks in the storage volume to store the new data, while the data blocks associated with the snapshot copies remain unchanged. If data blocks are deleted from the storage volume but the data blocks are locked by a snapshot, the related storage will not be actually freed up for reuse. When the last snapshot to reference the deleted blocks is removed, all data blocks that were being used for the purpose of maintaining the point-in-time copy are also released automatically, such that the space used for such blocks is freed up for reuse.

Moreover, for block level updates, the updated data can be written to a newly allocated block in the active file system, with references updated to point to the new data block instead of the corresponding old (preserved) data block. In some embodiments, snapshot creation utilizes a redirect-on-write (ROW) process, which means that after a snapshot is created, any new writes to the source volume will be redirected to a different storage location, while the original storage location used by the snapshot remains unchanged. In this instance, the original storage volume is never modified, and any write requests are redirected away from the original data into a new storage area. In other embodiments, snapshot creation utilizes a "copy-on-write" (COW) process whereby when a write request is made, the original data blocks are copied into a new storage area (to preserve the snapshot data), and then the original data blocks are modified. The COW process requires two data write processes, while the ROW process requires one write process.

The snapshot generation module 172 allows users to generate snapshots of existing volumes with a limit on the number of snapshots that can be generated per volume (e.g., 31 snapshots per volume, 127 snapshots per volume, etc.). In some embodiments, the snapshots of a given storage volume can be organized using a construct referred to as a "snapshot volume tree." The term "snapshot volume tree" as used herein refers to a data structure which holds a root volume and all snapshots associated with the volume, and which maintains a relationship between all snapshots resulting from one volume. A snapshot volume tree comprises a tree data structure that spans from the source volume as the root, whose siblings are either snapshots of the volume itself or descendants of it. In some embodiments, a snapshot volume tree is limited to 32 members—one for the original volume and 31 for additional snapshots (e.g., incremental snapshots).

In some exemplary embodiments where the data storage system 130 supports volume snapshots, the snapshot management system 170 is configured to impose a limitation on a maximum number of allowed snapshots that can be maintained for each storage volume 152 in the storage nodes 150 (e.g., limitation on the maximum number snapshots per storage volume). This limitation mandates the need to delete snapshots to make room for additional snapshots when the maximum limit is reached. In this regard, the snapshot deletion and metadata modification module 176 is configured to delete one or more of the snapshot data structures 154 or specific portions of a given snapshot data structure, which are stored in the storage devices 150. In some conventional implementations, previous versions of deleted snapshots are maintained in a snapshot volume tree but are not displayed to the user. These types of snapshots are called "ghost snapshots". The "ghost snapshots" are disadvantageous as they exhaust the reconstruction algorithm and, therefore, count for the maximum allowed snapshots for a given snapshot volume tree. In this regard, a ghost snapshot reduces the number of effective snapshots for a given snapshot volume tree.

When a given snapshot is deleted, some of the metadata written into the given snapshot must be preserved to maintain functionality of the surviving snapshots. The snapshot deletion and metadata modification module 176 performs a snapshot deletion process by transferring ownership of the metadata of the deleted snapshot to one of the surviving snapshots. In this regard, when a snapshot is deleted for whatever reason, care must be taken that any descendant snapshot spawned from the deleted snapshot does not become dysfunctional. If all the data that is owned by an ancestor snapshot is removed, then descendant snapshots cannot redirect to it. If a descendant snapshot is accessed to read data blocks that were not uniquely-written in it, the data cannot be retrieved. The process of transferring the ownership of data from a deleted snapshot to an existing snapshot involves modification of metadata, which process can adversely impact the overall system performance if not performed efficiently.

The process of modifying the metadata of a given snapshot to assume the ownership of the data of a deleted snapshot can adversely impact system performance in several ways. For example, the metadata modification process utilizes resources such as disk throughput and memory to perform the metadata modification process. In addition, the execution of metadata modification processes overtime can have a negative impact on the endurance of the disk (e.g., write amplification), especially SSDs. A primary goal of any storage system is therefore to minimize the required metadata modifications.

Figure 2:
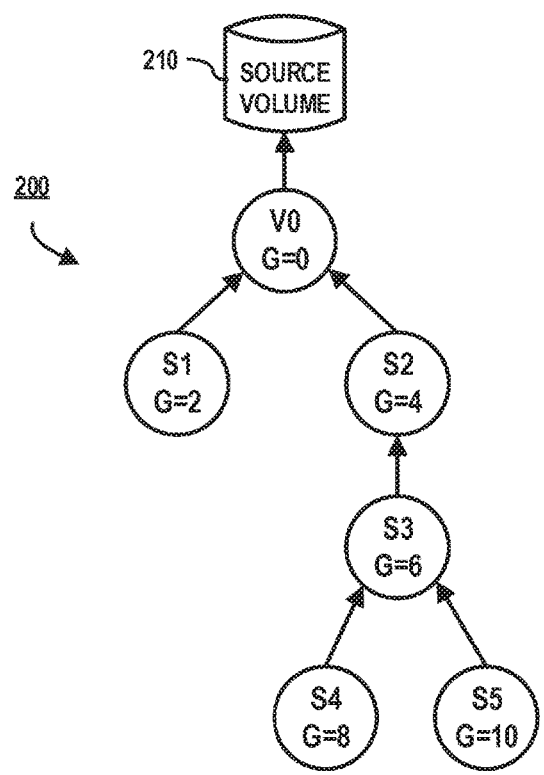
FIG. 2 schematically illustrates a snapshot volume tree with volume nodes that are assigned generation creation times to facilitate snapshot volume node deletion, according to an exemplary embodiment of the disclosure.

FIG. 2 schematically illustrates an exemplary embodiment of a snapshot volume tree 200 at a given point of time. The snapshot volume tree 200 (referred to as VTree) comprises a data structure which represents a given storage volume 210 and associated snapshots that are generated over time. The snapshot volume tree 200 comprises a tree data structure having a root volume V0, and a plurality of snapshots S1, S2, S3, S4, and S5. In some embodiments, the root volume V0 represents an initial snapshot that is taken of a given storage volume 210 at a given generation time G=0, snapshots S1 and S2 represent snapshots that are taken of the root volume V0 at different generation times G=2 and G=4, respectively, snapshot S3 represents a snapshot of snapshot S2 that that is generated at time G=6, snapshot S4 represents a snapshot of snapshot S3, which is generated at time G=8, and snapshot S5 represents a snapshot of the snapshot S3 which is generated at time G=10.

In the following description, each of V and $S_i$ is referred to as a "volume" or "volume snapshot" and its corresponding node is referred to as a "volume node" of the snapshot volume tree 200. Terms such as "volume" and "snapshot" as used herein are both intended to be broadly construed, and in some cases both terms are used to refer to a given node in a snapshot volume tree.

A volume v in the snapshot volume tree 200 is said to be the "host" to some data item $d_o$ at some volume offset o if the data item was written into v. A data item $d_o$ is uniquely described by a block of metadata information comprising its host, its owner, its write time, and the actual data (e.g., a reference to its address on disk). For example, in some embodiments, the snapshot management system generates and maintains metadata in Volume Time Objects (VTOs), where each VTO is a tuple such as:

<hostVolume, ownerVolume, writeTime, physicalAddress>, wherein each VTO is container of metadata which corresponds to a different block of data (e.g., 4 KB allocation unit) that is stored in the root storage volume associated with a given snapshot. The hostVolume denotes a volume node to which the data item was written. The ownerVolume denotes a volume node which is an owner (e.g., maintains) the VTO. The writeTime denotes a time when the data item associated with the VTO was written to a volume node in the snapshot volume tree. The physicalAddress denotes a physical address which actually stores the data item associated with the VTO, which is mapped to a logical address for the given data block in the source volume from which the snapshot volume tree is generated.

The volumes in the snapshot volume tree 200 have certain relationships as follows. For example, the direct descendants of a given volume v in a snapshot volume tree are referred to as v's "children." For example, in the exemplary snapshot volume tree 200 of FIG. 2, snapshots S1 and S2 are children of the root snapshot volume V0, snapshot S3 is a child of snapshot S2, snapshot S4 is a child of snapshot S3, snapshot S5 is a child of snapshot S3, and snapshot snapshots S4 and S5 have no children.

Furthermore, the "ancestors" of a given volume v in a snapshot volume tree 200 include all of the volumes $v_i$ that are encountered on a path between v and the root volume (including v itself). Such a path is always guaranteed to exist in the snapshot volume tree 200, since the volume snapshot tree 200 represents a relationship of inheritance between the root volume V and all its direct and indirect descendants. For example, in the snapshot tree 200 of FIG. 2, the ancestors of snapshot S5 include V0, S2, S3, and S5.

Snapshot Read Process

For a snapshot read operation, the premise is that a given snapshot volume node can only read a data item that was either written to the given snapshot volume node or written to an ancestor node of the given snapshot volume node. For example, in the exemplary snapshot volume tree 200 of FIG. 2, both volume nodes S1 and S2 are derived from the root volume node V0 so there is no significant relationship between S1 and S2.

A path in the snapshot volume tree 200 denotes a route from a given volume node to the root volume node V0. There is only one path from a given volume node in the snapshot volume tree to the root volume node V0. In this regard, only the volume nodes in a given path from a given volume node to the root volume node V0 can affect the results of reads from the given snapshot volume node. If you are able to iterate only through the data along the path, you only need to handle a portion of the data of the snapshot volume tree 200 by only having to look at nodes and data blocks that are relevant to that path.

Furthermore, if you catalog the data blocks in a certain way, you can avoid having to traverse all the volume nodes in the given path. We order/sort the data items in a way that takes into account: (i) the structure of the snapshot volume tree; (ii) a "generation time" of each volume node within the snapshot volume tree; and (iii) a "write time" of each data item.

In particular, the term "generation time" of a given volume node denotes an absolute time at which the given volume node was created. Within a given snapshot volume tree, it is established that no two volume nodes will have the same generation time. To implement this, the generation times of volume nodes illustrative comprise integer values that are incremented upon creation of the volume nodes (e.g., snapshot creation). For example, as shown in FIG. 2, the root volume node V0 has a generation time G=0, and every time a volume node is added to the snapshot volume tree 200, the generation time is incremented by, e.g., 2. The volume nodes e.g., snapshots S1, S2, S3, S4 and S5, have respective generation times G=2, G=4, G=6, G=8 and G=10. The generation times present a chronologic order of the creation of the volume nodes.

The term "write time" (Write Time) with respect to a data item denotes an absolute time at which the data item was written into its host volume. Within a given volume's snapshot tree, it is established that write times are always unique from volume generation times, i.e., a data item's write time cannot be equal to any the generation time of any volume node. Note that two data items written to different snapshots can have the same write time as long as no snapshot volumes were created in between.

As one possible implementation of the above, the generation times can comprise respective even-numbered integer values that are incremented upon snapshot creation. Further, the data write times can comprise odd-numbered integer values that satisfy: $Time(d_o)=1+Max(Time(v_i))$ for all volume nodes $v_i$ within a volume snapshot tree. It is to be appreciated, however, that other generation time and data item write time arrangements may be used.

A primary criteria for sorting data items of a given snapshot volume tree is a generation time of the volume that you are writing to. Another primary criteria for sorting data items of a given snapshot volume tree is a "current generation time" of the volume tree wherein the "current generation time" of the given snapshot volume tree denotes the generation time of the last volume node that was generated or deleted in the given snapshot volume tree. For example, in FIG. 2, current generation time of the snapshot volume tree 200 can be G=10, assuming that no volume nodes have been deleted from the snapshot volume tree 200.

Volume snapshot tree relationships will now be described in more detail.

The direct descendants of a volume v in a snapshot volume tree V are called v's "children." Formally: Children (v)={v'|v' is a direct descendant of v}.

In the example snapshot tree 200 illustrated in FIG. 2, it can be seen that:
Children(V0)={$S_1$, $S_2$}
Children(S2)={S3}
Children(S3)={S4, S5}
Children(S1)=Ø

The "ancestors" of a volume v in a volume snapshot tree V are all of the volumes $v_i$ that are encountered on a path between v and the root volume (including v itself). Such a path is always guaranteed to exist in V, since the volume snapshot tree represents a relationship of inheritance between the root volume and all its direct and indirect descendants. For example, in the snapshot tree 200 of FIG. 2, the ancestors of S5 are: Ancestors(S5)={V0, S2, S3, S5}

Note that the root volume itself may also be deleted, in which case it will be replaced as root by one of the surviving nodes; typically, by one of its children. It is assumed in illustrative embodiments herein that at any given time there shall be exactly one root to the graph, thereby guaranteeing the existence of a path to that root.

A volume v's "intermediate parent" with respect to some other volume v' in volume snapshot tree V is defined as a third volume, $v_{ip}$, that is both an ancestor of v and a child of v'. Formally: $v_{ip}$=IntermediateParent(v, v')=Ancestors (v)∩Children(v').

When v' is not an ancestor of v, the intermediate parent is the empty set Ø.

For example, with reference to the snapshot tree 200 of FIG. 2, it can be seen that:
IntermediateParent(S3, S2)={S3}
IntermediateParent(S5, S2)={S3}
IntermediateParent(S5, V0)={$S_2$}
IntermediateParent(S5, S1)=Ø

An exemplary process for efficient reading of data from stored snapshots will be described in further detail below with reference to FIG. 3. The algorithm illustratively determines the identity of the correct snapshot volume from which the data must be read, and the correct piece of data within that snapshot volume node, if there are multiple pieces available.

Figure 3:
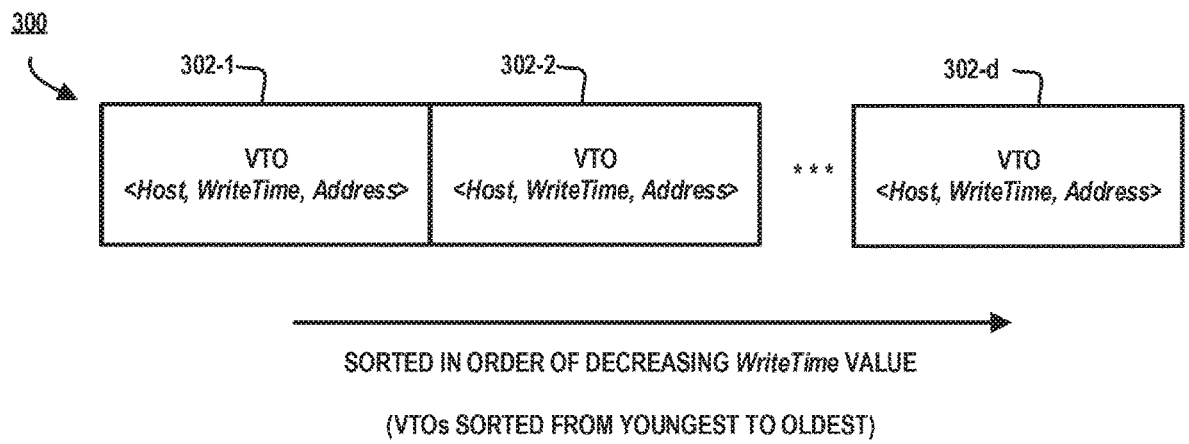
FIG. 3 schematically illustrates a method for sorting data items of volume nodes of a snapshot volume tree, according to an exemplary embodiment of the disclosure.

FIG. 3 schematically illustrates a method for sorting data items of volume nodes of a snapshot volume tree, according to an exemplary embodiment of the disclosure. In particular, FIG. 3 illustrates a sorted list 300 comprising a plurality (d) of VTOs 302-1, 302-2, . . . , 302-d (collectively referred to as VTOs 302). The VTOs 302 within the sorted list 300 comprise VTOs that are associated with a same logical address l within a given snapshot volume tree VTree, but sorted by the WriteTime of the VTOs. In this regard, the VTOs 302 within the list 300 are associated with the same data that are referenced by the same logical address, but wherein the data are modified versions of the same data (same logical address) that were written to the volume nodes at different Write Times.

In some embodiments, the sorted list 300 arranges the VTOs in order of decreasing WriteTime values so that the sorted list 300 arranges the VTOs associated with the same logical address in an order from the youngest to the oldest. For example, the VTO 302-1 may have a WriteTime=7, the VTO 302-2 may have a WriteTime=3, and the last VTO 302-$d$ may have a WriteTime=1. In other embodiments, the sorted list 300 of VTOs may be arranged in the order of increasing WriteTime values so that the sorted list 300 arranges the VTOs associated with the same logical address in an order from the oldest to the youngest.

As noted above, the WriteTime of a given VTO is derived based on a current generation time of snapshot volume tree corresponding to a given source volume. When data is written to the given source volume, the data is timestamped with a WriteTime value which is incremented from the current generation time of the snapshot volume tree. For example, assuming the current generation time of the snapshot volume tree is G=2, a data block that is written to a given logical address will be timestamped with a WriteTime=3.

Furthermore, as long as the snapshot volume tree remains the same (e.g., no new snapshot is created, or no snapshot is deleted, etc.), the current generation time of the snapshot volume tree will remain the same and all data that is written to volume nodes of the snapshot volume tree will have the same WriteTime. However, if modified data is written to a same logical address as the original data, the original data will be overwritten, as the snapshot management system will not allow two or more VTOs having the same logical address and the same WriteTime. But if a modified data item is written to a volume node at a given logical address after the current generation time of the snapshot tree has been incremented, the two VTOs associated with the original and modified data items can co-exist as the two VTOs will have different Write Times.

Figure 4:
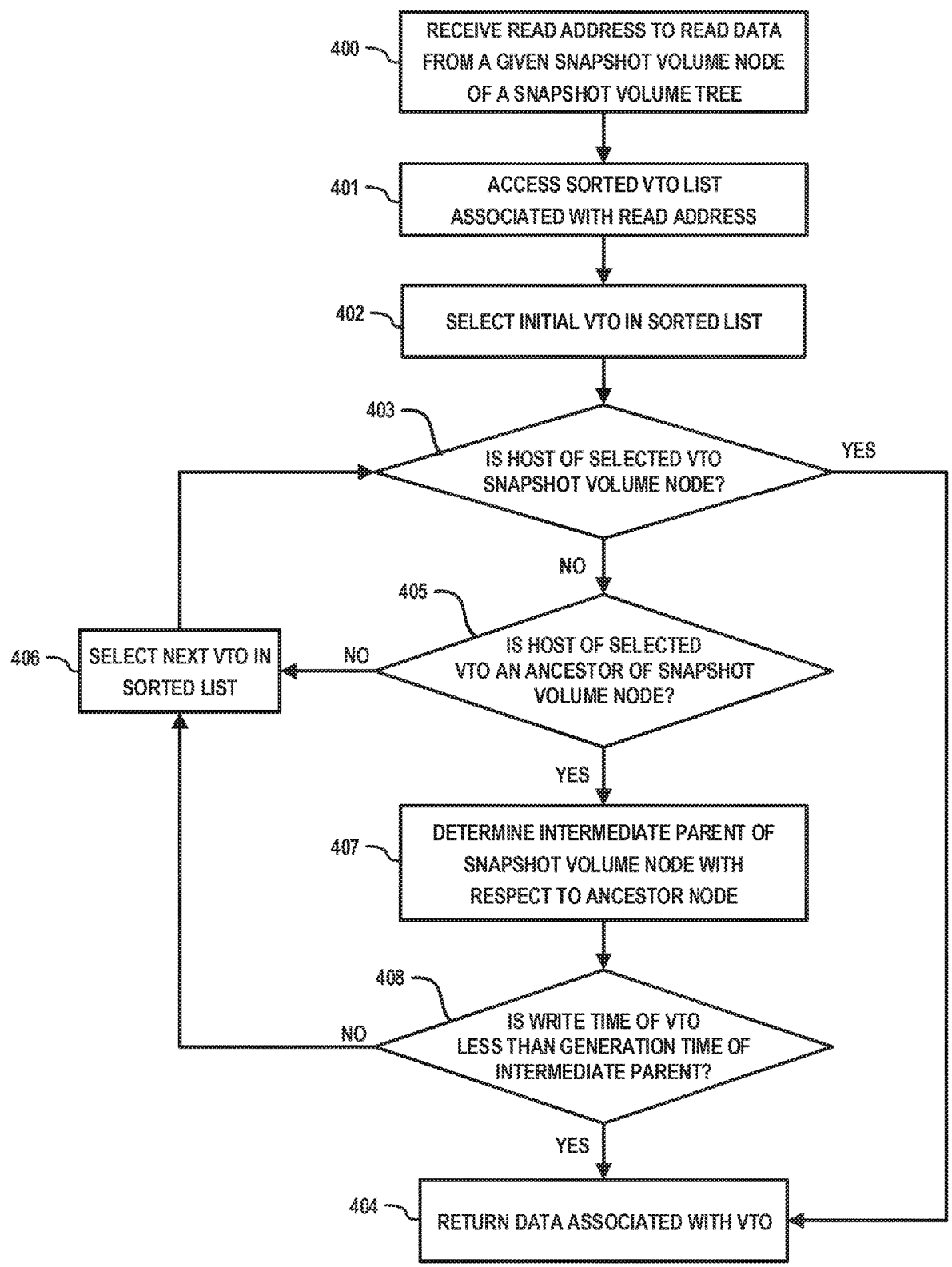
FIG. 4 is a flow diagram of a method for performing a snapshot read process according to an exemplary embodiment of the disclosure.

FIG. 4 is a flow diagram of a method for performing a snapshot read process according to an exemplary embodiment of the disclosure. In particular, FIG. 4 illustrates a read process that may be implemented by the snapshot read module 174 of the snapshot management system 170 (FIG. 1B). The snapshot read process is performed to read data from a given snapshot volume node in a snapshot volume tree. The snapshot management system 170 receives a read address from a user to read data from a given snapshot volume node of a snapshot volume tree (block 400). For example, in some embodiments, the read address will be a logical address to access a data item from the snapshot volume node. As noted above, for purposes of illustration, it is assumed that the logical address is associated with a single data block (e.g., 4 KB allocation unit).

The snapshot management system will proceed to access a sorted VTO list that is associated with the read address (block 401). The sorted VTO list will have one or more VTOs that are associated with the same logical address, but which have different WriteTimes resulting from different copies of the data item (e.g., modified versions) being stored in different volume nodes in the snapshot volume tree. The sorted VTO list will have the associated VTO sorted in a chronological, sequential order according to the different WriteTimes of the VTOs within the sorted list.

In an initial iteration of the sorted VTO list, the VTO having the greatest Write Time (i.e., the youngest VTO) will be selected for processing (block 402). The metadata of the selected VTO will be analyzed to determine the hostVolume of the VTO. As noted above, the hostVolume of the VTO denotes the host volume node in the snapshot tree to which the data item associated with VTO was written. In this regard, if the hostVolume of the VTO is the snapshot volume node that is being read from (affirmative determination in block 403), the data item is accessed from the target logical address and returned to the user (block 404). In this instance, since the requested data item was written to the given snapshot volume node, the data item can be read directly from the snapshot volume node.

On the other hand, if the hostVolume of the VTO is not the snapshot volume node that is being read from (negative determination in block 403), the snapshot read operation proceeds to determine if the hostVolume of the VTO is an ancestor volume node of the given snapshot volume node (block 405). In this instance, the snapshot read process will utilize a bit map or any other type of lookup process to determine whether or not the hostVolume of the VTO is an ancestor volume node of the given snapshot volume node.

If it is determined that the hostVolume of the VTO is not an ancestor volume node of the given snapshot volume node (negative determination in block 405), the snapshot read process will proceed to select the next youngest VTO in the sorted VTO list (block 406) to commence the next iteration of the read process. On the other hand, if it is determined that the hostVolume of the VTO is an ancestor volume node of the given snapshot volume node (affirmative determination in block 405), the snapshot read operation proceeds to determine which volume node in the snapshot volume tree is an intermediate parent of the snapshot volume node with respect to the ancestor volume node (block 406). The intermediate parent volume node will have an associated generation time Gen(intermediateParent(v, host(VTO)). The generation time of the intermediate parent volume node will be compared against the WriteTime of the VTO. If the WriteTime of the VTO is less than the generation time of the intermediate parent volume node (affirmative determination in block 408), the data item associated with the VTO will be returned to the user (block 404). On the other hand, if the WriteTime of the VTO is not less than the generation time of the intermediate parent volume node (negative determination in block 408), the snapshot read process continues to select the next sequential VTO in the sorted list (block 406), and a next iteration of the process is performed. When all VTOs within the sorted VTO list have been iterated, and no data has been found, the read process terminates and returns null data.

Snapshot Deletion Process

As noted above, the snapshot deletion and metadata modification module 176 (FIG. 1B) implements methods for deleting snapshot volume nodes from snapshot volume trees. There are several types of volume node deletion methods that are performed depending on whether the volume node being deleted is a leaf volume node or a non-leaf volume node. For a volume deletion process of a non-leaf volume node (e.g., an intermediate volume node that has at least one child node), the deletion process can be complex due to the need to alter the metadata associated with the sorted lists of VTOs that are associated with data items stored in association with the various volume nodes of a snapshot tree. Indeed, as noted above, when a given snapshot volume node is deleted from a given snapshot volume tree, the snapshot deletion and metadata modification module 176 performs a snapshot deletion process by transferring ownership of the metadata of the deleted snapshot to one of the surviving snapshots to maintain the functionality of the surviving snapshot volume nodes. An exemplary volume node deletion process is schematically illustrated in FIG. 5.

Figure 5:
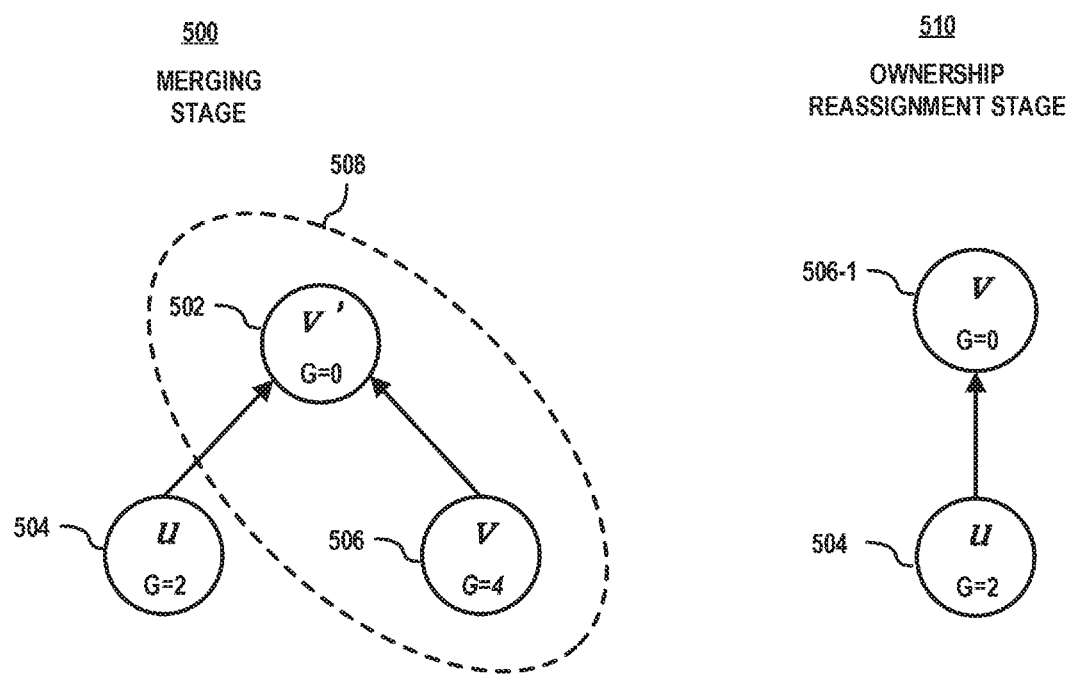
FIG. 5 schematically illustrates a volume node deletion process for deleting a non-leaf volume node in a snapshot volume tree, according to an exemplary embodiment of the disclosure.

In particular, FIG. 5 schematically illustrates a volume node deletion process for deleting a non-leaf volume node in a snapshot volume tree, according to an exemplary embodiment of the disclosure. On a high level, the volume node deletion process comprises a volume node merging stage 500 and an ownership reassignment stage 510. For illustrative purposes, FIG. 5 illustrates a snapshot volume tree, or a portion of a snapshot volume tree, comprising a volume node 502 ($v'$) with a generation time G=0, a volume node 504 ($u$) with a generation time G=2, and a volume node 506 ($v$) with a generation time G=4, wherein both of the volume nodes 504 and 506 are child nodes of the volume node 502. FIG. 5 schematically illustrates an exemplary process for deleting the volume node 502 by implementing a merging stage 500 and metadata ownership reassignment stage 510.

In the merging stage 500, a merging process 508 is performed to merge the volume node 506 into the place of the volume node 502 being deleted, and ultimately generate a new volume node 506-1. In this process, the youngest child node (e.g., volume node 506) is selected to participate in the deletion process as the volume node 506 (G=4) is the youngest child volume node among all the child nodes 504 (G=2) and 506 (G=4) of the volume node 502 being deleted. In this illustrative embodiment, the volume node 506 represents the last snapshot that was created from the volume node 502.

The volume node deletion process takes into account that deleting one or more volume nodes can take a relatively long time in which case a mechanism is implemented to ensure that a user can reference metadata information that was explicitly written to the one or more volume nodes for the duration of the deletion process. As part of the merging process 508, we reiterate over all the offsets associated with the volume node 502 that is being deleted and modify the metadata accordingly to complete the deletion process. During the process, we need to be able to reference the metadata that is written to the volume node 502 so that the volume nodes 504 and 506 (and other possible reader nodes) can read from the volume node 502 during the deletion process.

In some embodiments, as part of the merging operation 508 for deleting the volume node 502, a shadow copy of the volume node 502 is maintained, and the volume node 506 is configured to be an "alias" of the shadow copy of the volume node 502 being deleted. In this instance, when a read operation is performed during the deletion process which accesses some offset which references the volume node 502 being deleted, since the volume node 502 is no longer in the snapshot volume tree once the deletion process is commenced, the volume node 506 will serve as an alias for the volume node 502 so that references to metadata of the volume node 502 will be considered as references to the alias volume node 506.

For the deletion process, some metadata associated with VTOs will need to be disregarded altogether. In particular, in the exemplary embodiment of FIG. 5, it is assumed that the volume node 502 has a generation time G=0, the volume node 504 has a generation time G=2, and the volume node 506 has a generation time of G=4. Assume further that some block of data was written to the volume node 502 at some time T=5 (write Time). Since the write time T=5 is subsequent to the time G=4 that the volume node 506 was generated, neither of the volume nodes 504 or 506 can actually read data that is written to the parent volume node 502 as the write time T=5 is greater than the generation times of the volume nodes 504 and 506. In this instance, the associated data cannot be read as if it was written to the volume node 506. Therefore, for every VTO that is found which references the volume node 506, unless the write time that the given VTO was written is earlier than the generation time (e.g., G=4) of the volume node 506, the given VTO will be disregarded (e.g., deleted).

This discarding of the VTOs is what is referred to herein as an "alias barrier." The alias barrier is based on a relation between the generation time of the volume node 506 and the data that can be read. As part of the merging operation 508, the volume node 506 is merged with the volume node 502 that is being deleted such the volume node 506 becomes an alias of the shadow copy of the volume node 502. The alias barrier of the volume node 502 (being deleted) is set according to the generation time (e.g., G=4) of the volume node 506 (being merged). When the volume nodes 506 and 502 are merged, the identity of the volume node 506 is set to be the identity of the merged volume node 506-1, but the merged node 506-1 will adopt the generation time (e.g., G=0) of the volume node 502 that is being deleted. The reason for this is that a reference must be maintained to all metadata information that was written to the volume node 502, and which is still needed to maintain the relationship between such metadata and the other child nodes (e.g., volume node 504) which may need to read the metadata associated with the volume node 502. As such, the generation time of the volume node 502 is maintained, so that each child node of the deleted volume node 502 can become the child node of the new volume node 506-1 that is created at the completion of the merging operation 508. FIG. 5 schematically illustrates that following the merging process 508, the volume node 504 becomes a child of the newly merged node 506-1.

In addition to each child volume node of the volume node 502 becoming a child of the merged node 506-1, the volume node 506 becomes the parent node of each child node of the merged node 506-1. Furthermore, any parent volume node of the deleted volume node 502 becomes a parent of the merged node 506-1. Assuming that the volume node 502 is a root volume node, the new parent of the merged node 506-1 is null.

In the ownership reassignment stage 510, the process makes the requisite ownership transfers of metadata. In this instance, we have an array of metadata descriptors (e.g., sorted lists of VTOs) some of which are hosted by the deleted volume node 502. The newly created node 506-1 will be a host of any metadata that was hosted by either the deleted volume node 502 or the volume node 506. However, with regard to "ownership", if one of the nodes 502 and 506 of the merged node 506-1 used to own metadata information that is now read by the new volume 506-1, the newly created node 506-1 will own that metadata. Otherwise, the newly created node 506-1 will not own such metadata. The term "InAccessibles" as used herein denotes the set of data segments that are no longer relevant as a result of the deletion of the volume node 502. For example, assume that there was some data that was written to the volume node 502 after the snapshot volume nodes 504 and 506 were generated, then such data is inaccessible and cannot be read. In this instance, the set of inaccessible data includes all the VTOs that were hosted by the volume node 502 and/or written past the alias barrier of the volume node 502.

As part of the deletion process, we assume that once a volume node is marked for deletion, the marked volume node cannot be read from, or written to, or have snapshots created therefrom. Furthermore, we assume there exists an efficient way, to enumerate all logical addresses 1, where a given volume v is OwnerAt(l). In other words, we assume that a mechanism exists to iterate over all logical offsets in the volume tree, where the volume node 506 was an owner of the data, in order to modify the metadata as needed to reassign ownership and complete the deletion process.

Figure 6:
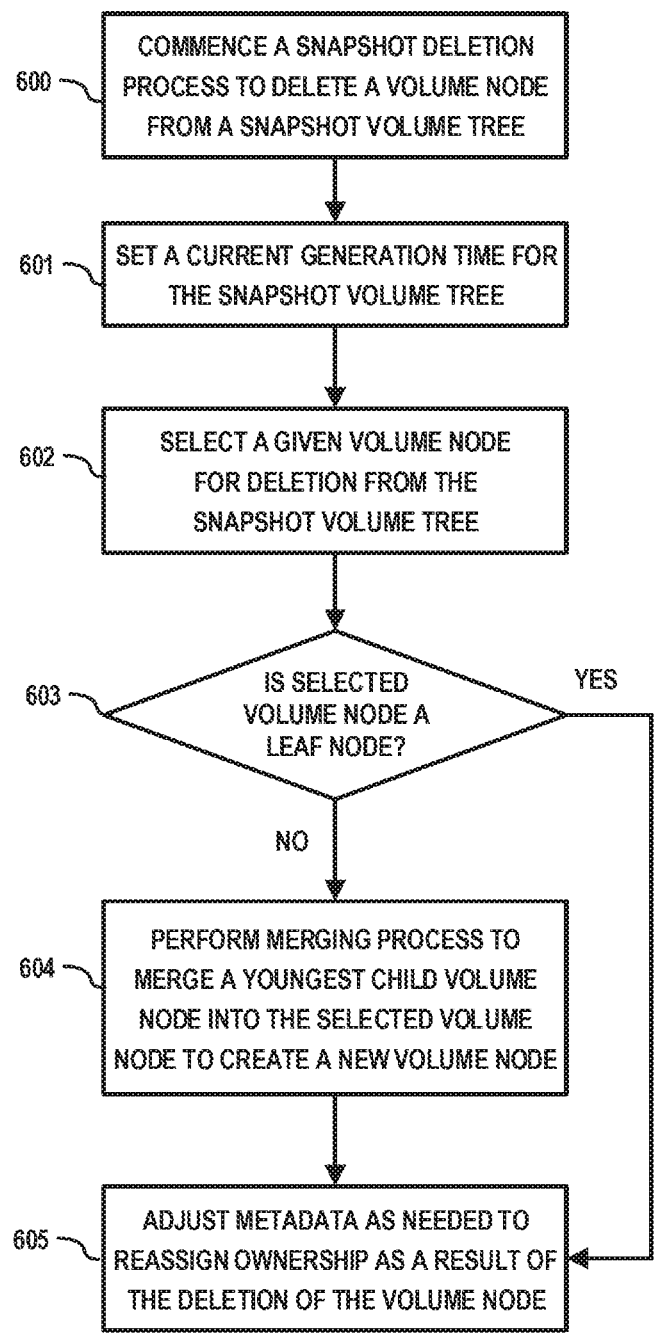
FIG. 6 is a flow diagram of a method for performing a volume node deletion process according to an exemplary embodiment of the disclosure.

FIG. 6 is a flow diagram of a method for deleting a volume node in a snapshot volume tree, according to an exemplary embodiment of the disclosure. In some embodiments, the volume node deletion process of FIG. 6 illustrates an exemplary mode of operation of the snapshot deletion and metadata modification module 176. A volume node deletion process is commenced to modify a given snapshot volume tree by deleting at least one volume node from the snapshot volume tree (block 600). In some embodiments, the volume node deletion process is commenced by a user, administrator, etc., who issues a remove snapshot command that is processed by the snapshot management system 170. In some embodiments, the volume node deletion process is performed automatically to remove one or more snapshots to comply with a snapshot creation and retention policy that is utilized for automated snapshot lifecycle management. When the volume node deletion process is commenced, the system will set a current generation time for the snapshot volume tree (block 601). For example, the current generation time of the snapshot volume tree is incremented by a given value (e.g., current generation time+2).

For purposes of discussion, we assume that a single snapshot volume node has been selected for deletion from the snapshot volume tree. In this instance, a selected snapshot volume node is marked for deletion (block 602). The snapshot management system 170 will prevent the volume node which is selected for deletion from being included as a member of a group of reader nodes for a given physical offset in a snapshot read process that may be performed at some time during the deletion process or afterwards. This is true despite a shadow copy of the deleted volume node being maintained for the duration of the deletion process.

A determination is then made as to whether the selected volume node which is marked for deletion is a leaf node (block 603). If the selected volume node is not a leaf node (negative determination in block 603), a merging process is performed to merge a youngest child volume node into the selected volume node to create a new volume node (block 604). As noted above, this merging process comprises various operations. An initial step involves determining the generation time of each volume node that is a child of the selected volume node that has been marked for deletion. For example, in the illustrative embodiment of FIG. 5, assuming the volume node 502 is marked for deletion and that the volume node 502 has only the two child volume nodes 504 and 506, the volume node 506 is deemed the youngest child node of the volume node 502 which is marked for deletion in view of the generation time G=4 of volume node 504 being greater than the generation time G=2 of the child volume node 504. The volume node deletion process is configured to disregard all metadata that is no longer relevant as a result of the removal of a given volume node from a snapshot volume tree. In the instance where the volume node that is marked for deletion has child volume nodes, the metadata to be disregarded will include includes all the metadata that was written after the generation time of the youngest child node of volume node that is marked for deletion.

As part of the merging process for removing of the non-leaf volume node (in block 604), the volume node that is marked for deletion is effectively replaced by the youngest child volume node by changing the hierarchical position of the child volume node in the snapshot volume tree to the hierarchical position of the deleted volume node in the snapshot volume tree, and adjusting metadata and other parameters of the child volume node to effectively generate a new volume node in place of the deleted volume node. In addition, the child volume node assumes the generation value of the deleted volume node (e.g., as shown in FIG. 5, the new volume node 506-1 has a generation time of G=0, which is the same as the deleted volume node 502).

Following the merge process, the metadata of the volume nodes is adjusted as needed to reassign ownership of the metadata (e.g., VTOs) as a result of the deletion of the volume node (block 605). As noted above, given that the deletion process can be prolonged, a shadow copy of the deleted volume node is generated and maintained for the duration of the deletion process, and the child volume node is set as an "alias" of the deleted volume node. The reason for this is that there can be a significant amount of metadata with references to the deleted volume node. During the process of reconfiguring the metadata, the shadow copy of the deleted volume node, together with the designated alias volume node, allows the sorted metadata to be traversed to find references to the deleted volume node in the metadata.

When such references to the deleted volume node are found, the ownership of the metadata can be transferred to the alias volume node so that the metadata can be referenced to the new volume node. As noted above, in the illustrative embodiment of FIG. 5, the child volume node 506 is designated as the alias node for the deleted volume node 502. In addition, the alias barrier of the deleted volume node is set to be the generation time of the merged volume node 506, so that any data that was written after the generation time of the volume node 506 is deemed no longer relevant.

Figure 7:
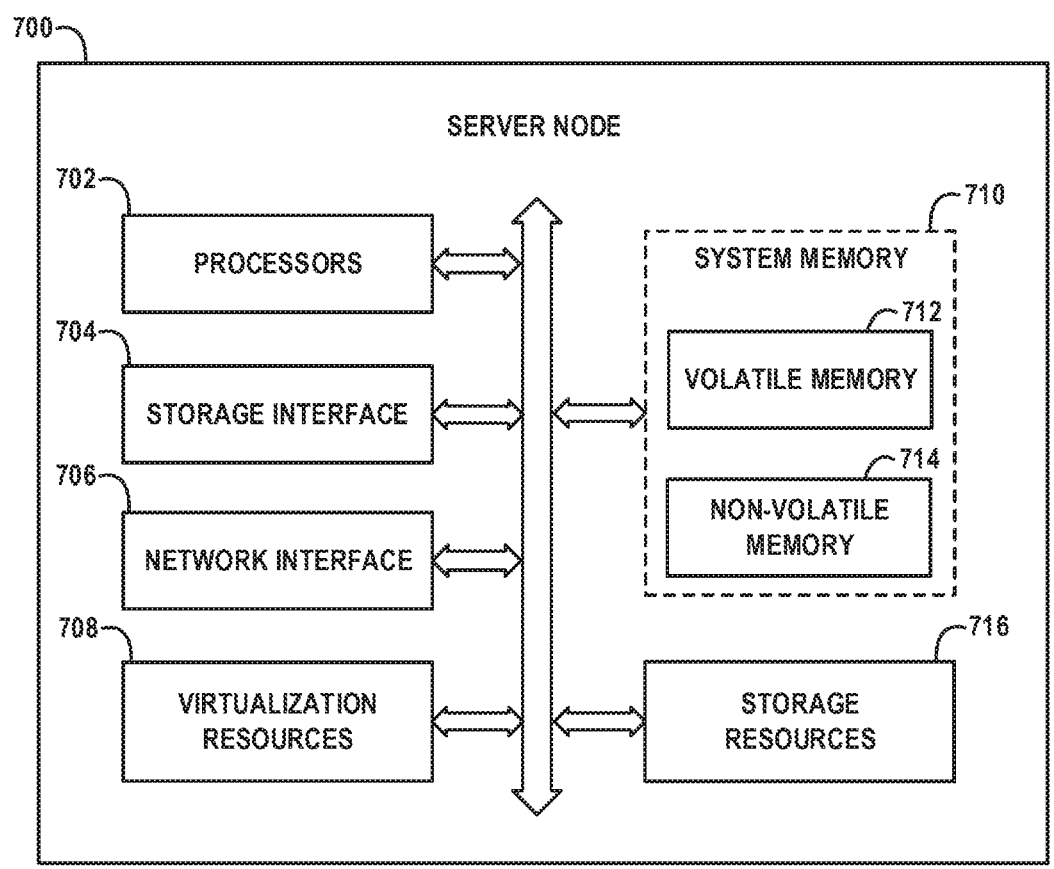
FIG. 7 schematically illustrates a framework of a server node for implementing a storage node which hosts a snapshot management system according to an exemplary embodiment of the disclosure.

FIG. 7 schematically illustrates a framework of a server node (e.g., storage node 140, FIGS. 1A and 1B) which can be implemented for hosting a storage control system such as shown in FIG. 1B, according to an exemplary embodiment of the disclosure. The server node 700 comprises processors 702, storage interface circuitry 704, network interface circuitry 706, virtualization resources 708, system memory 710, and storage resources 716. The system memory 710 comprises volatile memory 712 and non-volatile memory 714.

The processors 702 comprise one or more types of hardware processors that are configured to process program instructions and data to execute a native operating system (OS) and applications that run on the server node 700. For example, the processors 702 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 704 enables the processors 702 to interface and communicate with the system memory 710, the storage resources 716, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 706 enables the server node 700 to interface and communicate with a network and other system components. The network interface circuitry 706 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 708 can be instantiated to execute one or more services or functions which are hosted by the server node 700. For example, the virtualization resources 708 can be configured to implement the various modules and functionalities of the storage control system 160 (FIG. 1B) as discussed herein. In one embodiment, the virtualization resources 708 comprise virtual machines that are implemented using a hypervisor platform which executes on the server node 700, wherein one or more virtual machines can be instantiated to execute functions of the server node 700. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 700, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 708 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 700 as well execute one or more of the various modules and functionalities of the storage control system 160 as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various components of the storage control systems, snapshot management systems, and data backup management systems comprise program code that is loaded into the system memory 710 (e.g., volatile memory 712), and executed by the processors 702 to perform respective functions as described herein. In this regard, the system memory 710, the storage resources 716, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 710 comprises various types of memory such as volatile RAM, NVRAM, or other types of memory, in any combination. The volatile memory 712 may be a dynamic random-access memory (DRAM) (e.g., DRAM DIMM (Dual In-line Memory Module), or other forms of volatile RAM. The non-volatile memory 714 may comprise one or more of NAND Flash storage devices, SSD devices, or other types of next generation non-volatile memory (NGNVM) devices. The system memory 710 can be implemented using a hierarchical memory tier structure wherein the volatile system memory 712 is configured as the highest-level memory tier, and the non-volatile system memory 714 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 702 to execute a native operating system and one or more applications or processes hosted by the server node 700, and to temporarily store data that is utilized and/or generated by the native OS and application programs and processes running on the server node 700. The storage resources 716 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
maintaining, by a snapshot management system, a snapshot volume tree for a storage volume of a storage system, wherein the snapshot volume tree comprises a data structure which comprises a plurality of snapshot volume nodes corresponding to respective ones of (i) a root storage volume and (ii) multiple snapshots related directly or indirectly to the root storage volume, wherein the snapshot volume nodes comprise respective generation numbers which denote a chronological order in which the respective snapshot volume nodes were created;
receiving, by the snapshot management system, a read request comprising a read address for accessing a given data item from a target snapshot volume node;
accessing, by the snapshot management system, a sorted list of one or more metadata objects which are associated with a same logical address corresponding to the read address, wherein each of the one or more metadata objects corresponds to a different version of the given data item stored in different snapshot volume nodes of the snapshot volume tree, wherein each metadata object in the sorted list comprises a descriptor that identifies a host volume node of the given version of the data item, (ii) the associated logical address, and (iii) a descriptor which identifies a write time of the given version of the data item, wherein the write time is based on a current generation number of the snapshot volume tree at a time when the given version of the data item was written;
iteratively processing, by the snapshot management system, the one or more metadata objects in the sorted list to identify a target version of the given data item which can be read from one of (i) the target snapshot volume node and (ii) another snapshot volume node which is an ancestor of the target snapshot volume node and which has a generation number that is greater than the write time of the target version of the given data item; and
responding to the read request by returning the identified target version of the data item.

2. The method of claim 1, wherein:
the read address comprises a logical address which is associated with the sorted list of one or more metadata objects;
the current generation number of the snapshot volume tree comprises a generation number of a last snapshot volume node of the snapshot volume tree that was either generated or deleted;
the write time of the given version of the data item comprises an increment of the current generation number of the snapshot volume tree at the time when the given version of the data item was written.

3. The method of claim 1, wherein the one or more metadata objects of the sorted list are sorted in a chronological order based on the write time descriptors in the metadata objects.

4. The method of claim 3, wherein iteratively processing the one or more metadata objects in the sorted list comprises sequentially processing the one or more metadata objects in the chronological order starting with the metadata object having a greatest write time descriptor.

5. A method, comprising:
maintaining, by a snapshot management system, a snapshot volume tree for a storage volume of a storage system, wherein the snapshot volume tree comprises a data structure which comprises a plurality of snapshot volume nodes corresponding to respective ones of (i) a root volume and (ii) multiple snapshots related directly or indirectly to the root volume, wherein the snapshot volume nodes comprise respective generation times which denote times that the respective snapshot volume nodes were created;
receiving, by the snapshot management system, a read request comprising a read address for accessing a given data item from a target snapshot volume node;
accessing, by the snapshot management system, a sorted list of one or more metadata objects, wherein each of the one or more metadata objects corresponds to a different version of the given data item stored in different snapshot volume nodes of the snapshot volume tree, wherein each metadata object comprises a descriptor that identifies a host volume node of the given version of the data item and a descriptor which identifies a write time of the given version of the data item;
iteratively processing, by the snapshot management system, the one or more metadata objects in the sorted list to identify a target version of the given data item which can be read from one of (i) the target snapshot volume node and (ii) another snapshot volume node which is an ancestor of the target snapshot volume node and which has a generation time that is greater than the write time of the target version of the given data item; and
responding to the read request by returning the identified target version of the data item;
wherein iteratively processing comprises:
accessing a metadata object in the sorted list;
reading the descriptor of the host volume node to determine an identify of the host volume node associated with the accessed metadata object; and
in response to determining that the target snapshot volume node is the identified host volume node, responding to the read request by returning the target version of the data item associated with the accessed metadata object.

6. The method of claim 5, further comprising:
in response to determining that the identified host volume node is not the target snapshot volume node:
determining whether the identified host volume node is an ancestor volume node of the target snapshot volume node; and
in response to determining that the identified host volume node is not an ancestor volume node of the target snapshot volume node, performing another iteration by accessing a next metadata object in the sorted list.

7. The method of claim 6, further comprising:
in response to determining that the identified host volume node is an ancestor volume node of the target snapshot volume node:

determining an intermediate parent volume node of the target snapshot volume node with respect to the ancestor volume node;
determining whether a generation time of the intermediate parent volume node is greater than the write time associated with the accessed metadata object; and
in response to determining that the generation time of the intermediate parent volume node is greater than the write time associated with the accessed metadata object, responding to the read request by returning the target version of the data item associated with the accessed metadata object.

8. An article of manufacture comprising a non-transitory processor-readable storage medium having stored therein program code of one or more software programs, wherein the program code is executable by one or more processors to implement the method of claim 1.

9. An apparatus, comprising:
at least one processor; and
system memory configured to store program code, wherein the program code is executable by the at least one processor to implement a snapshot management system which is configured to perform the method of claim 1.

10. A method, comprising:
maintaining, by a snapshot management system, a snapshot volume tree for a storage volume of a storage system, wherein the snapshot volume tree comprises a data structure which comprises a plurality of snapshot volume nodes corresponding to respective ones of (i) a root volume and (ii) multiple snapshots related directly or indirectly to the root volume, wherein the snapshot volume nodes comprise respective generation times which denote times that the respective snapshot volume nodes were created; and
performing, by the snapshot management system, a volume node deletion process to delete a target snapshot volume node from the snapshot volume tree, wherein performing the volume node deletion process comprises:
determining whether the target snapshot volume node has one or more child volume nodes;
in response to determining that the target snapshot volume node does have one or more child volume nodes, determining which child volume node is a youngest child volume node based on the respective generation times of the one or more child volume nodes; and
merging the determined youngest child volume node with the target snapshot volume node to create a new snapshot volume node which resides in a same hierarchical position as the target snapshot volume node in the snapshot volume tree and which is assigned the generation time of the target snapshot volume node.

11. The method of claim 10, wherein performing the volume node deletion process further comprises marking the target snapshot volume node for deletion such that during the volume node deletion process, the target snapshot volume node is prevented from (i) being read from, (ii) being written to, and (iii) having new snapshot volume nodes created therefrom.

12. The method of claim 10, wherein merging the determined youngest child volume node with the target snapshot volume node comprises:

generating a shadow copy of the target snapshot volume node; and
designating the youngest child volume node as an alias node of the target snapshot volume node; and
utilizing the shadow copy and the alias node to transfer references to metadata associated with the shadow copy to the alias node.

13. The method of claim 12, further comprising:
setting an alias barrier value of the target snapshot volume node to be a generation time of the youngest child node such that any data which has been written to the snapshot volume tree which has a write time that is greater than alias barrier value will be deemed irrelevant.

14. The method of claim 10, further comprising designating the new snapshot volume node to be a parent snapshot volume node of each snapshot volume node that was previously a child of the target snapshot volume node that was deleted.

15. An article of manufacture comprising a non-transitory processor-readable storage medium having stored therein program code of one or more software programs, wherein the program code is executable by one or more processors to implement the method of claim 10.

16. An apparatus, comprising:
at least one processor; and
system memory configured to store program code, wherein the program code is executable by the at least one processor to implement a snapshot management system which is configured to:
maintain a snapshot volume tree for a storage volume of a storage system, wherein the snapshot volume tree comprises a data structure which comprises a plurality of snapshot volume nodes corresponding to respective ones of (i) a root volume and (ii) multiple snapshots related directly or indirectly to the root volume, wherein the snapshot volume nodes comprise respective generation times which denote times that the respective snapshot volume nodes were created; and
perform a volume node deletion process to delete a target snapshot volume node from the snapshot volume tree, wherein in performing the volume node deletion process, the snapshot management system is configured to:
determine whether the target snapshot volume node has one or more child volume nodes;
determine which child volume node is a youngest child volume node based on the respective generation times of the one or more child volume nodes, in response to determining that the target snapshot volume node does have one or more child volume nodes; and
merge the determined youngest child volume node with the target snapshot volume node to create a new snapshot volume node which resides in a same hierarchical position as the target snapshot volume node in the snapshot volume tree and which is assigned the generation time of the target snapshot volume node.

17. The apparatus of claim 16, wherein in performing the volume node deletion process, the snapshot management system is further configured to mark the target snapshot volume node for deletion such that during the volume node deletion process, the target snapshot volume node is prevented from (i) being read from, (ii) being written to, and (iii) having new snapshot volume nodes created therefrom.

18. The apparatus of claim 16, wherein in merging the determined youngest child volume node with the target snapshot volume node, the snapshot management system is configured to:
- generate a shadow copy of the target snapshot volume node;
- designate the youngest child volume node as an alias node of the target snapshot volume node; and
- utilize the shadow copy and the alias node to transfer references to metadata associated with the shadow copy to the alias node.

19. The apparatus of claim 18, wherein the snapshot management system is further configured to set an alias barrier value of the target snapshot volume node to be a generation time of the youngest child node such that any data which has been written to the snapshot volume tree which has a write time that is greater than alias barrier value will be deemed irrelevant.

20. The apparatus of claim 16, wherein the snapshot management system is further configured to designate the new snapshot volume node to be a parent snapshot volume node of each snapshot volume node that was previously a child of the target snapshot volume node that was deleted.

\* \* \* \* \*